(12) United States Patent
Deng et al.

(10) Patent No.: US 9,305,342 B2
(45) Date of Patent: Apr. 5, 2016

(54) METHOD FOR ACQUIRING A BOUNDARY LINE OF AN ALIGNMENT FILM AND METHOD FOR INSPECTING THE ALIGNMENT FILM

(71) Applicant: Shenzhen China Star Optoelectronics Technology Co., Ltd., Shenzhen, Guangdong (CN)

(72) Inventors: Hongtao Deng, Shenzhen (CN); Tsung-i Hung, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 29 days.

(21) Appl. No.: 14/234,142

(22) PCT Filed: Dec. 24, 2013

(86) PCT No.: PCT/CN2013/090348
§ 371 (c)(1),
(2) Date: Jan. 21, 2014

(87) PCT Pub. No.: WO2015/089859
PCT Pub. Date: Jun. 25, 2015

(65) Prior Publication Data
US 2015/0178909 A1  Jun. 25, 2015

(30) Foreign Application Priority Data
Dec. 20, 2013 (CN) .......................... 2013 1 0710999

(51) Int. Cl.
*G06K 9/48* (2006.01)
*G06K 9/36* (2006.01)
*G02F 1/141* (2006.01)
*G06T 7/00* (2006.01)

(52) U.S. Cl.
CPC ............. *G06T 7/0004* (2013.01); *G06T 7/0028* (2013.01); *G06T 2207/30121* (2013.01)

(58) Field of Classification Search
CPC ........... G06T 2207/30148; G06T 2207/30141; G06T 2207/30121; G06T 7/0002; G06T 7/0018; G06T 7/0022; G06T 7/004; G06T 7/0079; G06T 7/0024; G06T 7/0004; G06T 7/0008
USPC ......... 382/151, 143, 144, 145, 147, 149, 152, 382/172, 173, 190, 199, 237, 266, 274, 272, 382/297; 428/123, 382; 349/123, 129, 187, 349/141; 359/243, 241, 321; 427/508; 356/399, 401
See application file for complete search history.

(56) References Cited

U.S. PATENT DOCUMENTS 8,179,354 B2 * 5/2012 Chen et al. ...................... 345/98
8,717,522 B2 * 5/2014 Choi .............................. 349/123
(Continued)

FOREIGN PATENT DOCUMENTS

CN  102799887 A  11/2011
CN  103257465 A  8/2013

*Primary Examiner* — Sheela C Chawan
(74) *Attorney, Agent, or Firm* — Andrew C. Cheng

(57) ABSTRACT

The present invention provides a method for acquiring a boundary line of an alignment film, including the steps of: processing an edge of an image and determining the boundary line of the alignment film; conducting a first screen over the determined boundary line, and excluding a straight boundary line; and conducting a second screen toward the firstly-screened boundary line, and selecting the outmost boundary line as the actual boundary line of the alignment film. The present invention further provides a method for inspecting an alignment film. According to the method for acquiring a boundary line of an alignment film and the method for inspecting the alignment film provided the present invention, not only the actual boundary line of the alignment film could be acquired quickly and accurately by screening the determined boundary line, but also the error rate of determining the boundary line of the alignment film could be lowered, so as to facilitate the control and prevention of the alignment film; and the method is simple and easy to operate.

8 Claims, 2 Drawing Sheets

(56) References Cited

U.S. PATENT DOCUMENTS

| | | | |
|---|---|---|---|
| 2007/0116350 A1* | 5/2007 | Cheverton | 382/151 |
| 2012/0152899 A1* | 6/2012 | Shih et al. | 216/67 |
| 2013/0162920 A1* | 6/2013 | Terashita et al. | 349/24 |
| 2015/0090793 A1* | 4/2015 | Zhang et al. | 235/462.09 |

* cited by examiner

METHOD FOR ACQUIRING A BOUNDARY LINE OF AN ALIGNMENT FILM AND METHOD FOR INSPECTING THE ALIGNMENT FILM

FIELD OF THE INVENTION

The present invention relates to a technical field of manufacturing liquid crystal display, and more particularly to a method for acquiring a boundary line of an alignment film and a method for inspecting the alignment film.

BACKGROUND OF THE INVENTION

A liquid crystal display device has many advantages including thin, compact, energy-saving, no radiation, and so on, as a result, it has been widely used in different applications. Liquid crystal displays available in the market today are mainly so-called backlit liquid crystal display, which include a liquid crystal display panel and a backlight module. The working principle of the liquid crystal display panel is that the liquid crystal molecules are placed between two parallel glass substrates, and the direction of the liquid crystal molecules is controlled by applying working voltage to the glass substrate, so as to generate the image by refracting the light of the backlight module through the liquid crystal display panel.

An alignment film is used to align the liquid crystal molecules in a predetermined direction, such that the liquid crystal molecules of the liquid crystal display panel can be manipulated to have a consistent direction or orientation. All or parts of the liquid crystal molecules need synchronic and consistent action, so that the display can appear quickly and consistently when an electric field drives the liquid crystal molecules.

The new coating technique for creating an alignment film is by inkjet-coating method, deploying a layer of polyimide (PI) liquid onto a thin film transistor substrate or a color filter substrate, and then heating to evaporate the solvent in the PI liquid, thereby an alignment film of fixed thickness is formed. However, because the PI liquid has fluidity, it will fan out during the curing process, and the PI liquid at the edges may flow to somewhere without creating a coating thereof, so that the linearity at the edges is poor after the PI liquid is cured, and an edge wave is easily presented. Currently, the method for improving edge wave is based on controlling the size of the droplets. The dots per inch (DPI) is used as a measure of improvement, and the higher the DPI, the higher the linearity. Substantially, smaller PI droplets are adopted and are arranged in more dense manner for achieving higher DPI, but the edge wave still occurs actually. Furthermore, drying speed of edges is different, so uneven thickness region is formed at edges, which is called Halo area or Edge area. If the Halo area is located in the display area (Active area), then the edge of the screen, which is under 25% gray level, will be whitish clearly. Therefore, it is particularly important to acquire an accurate boundary line of the alignment film during the subsequent processes including detecting the alignment film and the precision of cutting. However, the brightness of the boundary changes more after the PI liquid fans out, and there are a large number of metal lines on a glass substrate, so that the error rate of determining the boundary line of the alignment film is high currently, and thus the subsequent processes are affected.

SUMMARY OF THE INVENTION

In order to resolve the technical issue encountered by the prior art, the present invention provides a method for acquiring a boundary line of an alignment film and a method for inspecting the alignment film, which can facilitate to acquire the actual boundary line of an alignment film quickly, simply and accurately, and the error rate of determining the boundary line of the alignment film could be lowered.

In order to achieve the above objects, the present invention provides a method for acquiring a boundary line of an alignment film, including the steps of:

A. processing an edge of an image and determining the boundary line of the alignment film;

B. conducting a first screen over the determined boundary line, and excluding a straight boundary line; and C. conducting a second screen toward the firstly-screened boundary line, and selecting the outmost boundary line as the actual boundary line of the alignment film.

Wherein, the step B substantially includes the sub-steps of: selecting a baseline and randomly selecting a plurality of segments of any determined boundary line; and calculating angles between the plurality of segments and the baseline, if all the angles demonstrate a fixed value, then exclude the boundary line.

Wherein, the step B substantially includes the sub-steps of: randomly selecting a plurality of segments of any determined boundary line; and calculating angular differences between the plurality of segments, and the boundary line is excluded if either the angular difference is 0 degree or 180 degrees.

Wherein, the step A substantially includes the sub-steps of: performing a binarization process toward the image; selecting any one of pixels within the image and comparing it with pixels surround the selected pixel; the selected pixel is excluded if the gray value is consistent to the value of the surrounding pixels; and the selected pixel is kept if the gray value of the selected pixel is different to the gray value of any one of the surrounding pixels.

Wherein, the step C substantially includes the steps of: establishing a x-y coordinate system; with X-axis value kept in a fixed value, keeping maximum and minimum value of the Y-axis, and deleting all other values of the Y-axis; and with Y-axis value kept in a fixed value, keeping maximum and minimum value of the X-axis, and deleting all other values of the X-axis.

The other object of the present invention is to provide a method for inspecting an alignment film, including the steps of:

adopting a method for acquiring an actual boundary line of an alignment film as recited above;

performing a process of determining within an image of the alignment film; and performing a comparison between the processed image with data stored within a database so as to determine whether there is a defect.

Wherein, the step B substantially includes the sub-steps of: selecting a baseline and randomly selecting a plurality of segments of any determined boundary line; and calculating angles between the plurality of segments and the baseline, if all the angles demonstrate a fixed value, then exclude the boundary line.

Wherein, the step B substantially includes the sub-steps of: randomly selecting a plurality of segments of any determined boundary line; and calculating angular differences between the plurality of segments, and the boundary line is excluded if all the angular differences demonstrate fixed values.

Wherein, the step A substantially includes the sub-steps of: performing a binarization process toward the image; selecting any one of pixels within the image and comparing it with pixels surround the selected pixel; the selected pixel is excluded if the gray value is consistent to the value of the surrounding pixels; and the selected pixel is kept if the gray value of the selected pixel is different to the gray value of any one of the surrounding pixels.

Wherein, the step C substantially includes the steps of: establishing a x-y coordinate system; with X-axis value kept in a fixed value, keeping maximum and minimum value of the Y-axis, and deleting all other values of the Y-axis; and with Y-axis value kept in a fixed value, keeping maximum and minimum value of the X-axis, and deleting all other values of the X-axis.

According to the method for acquiring a boundary line of an alignment film and the method for inspecting the alignment film provided the present invention, not only the actual boundary line of the alignment film could be acquired quickly and accurately by screening the determined boundary line, but also the error rate of determining the boundary line of the alignment film could be lowered, so as to facilitate the control and prevention of the alignment film; and the method is simple and easy to operate.

BRIEF DESCRIPTION OF DRAWINGS

FIG. 2 is a structural and illustrational view of performing the method for acquiring a boundary line of an alignment film provided by the present invention; wherein FIG. 2a is a structural and illustrational view of determining the boundary line of the alignment film; wherein FIG. 2b is a structural and illustrational view of conducting a first screen over the determined boundary line; and wherein

DETAILED DESCRIPTION OF PREFERRED EMBODIMENT

Now, a detailed description will be given with respect to preferred embodiments provided and illustrated here below with accompanied drawings. The legends are shown in the accompanied drawings, wherein the same legends always indicate the same or the substantially identical parts. In order to give a better and thorough understanding to the whole and other intended purposes, features and advantages of the present invention or the technical solution of the prior art, detailed description will be given with respect to preferred embodiments provided and illustrated here below in accompanied drawings.

Figure 1:
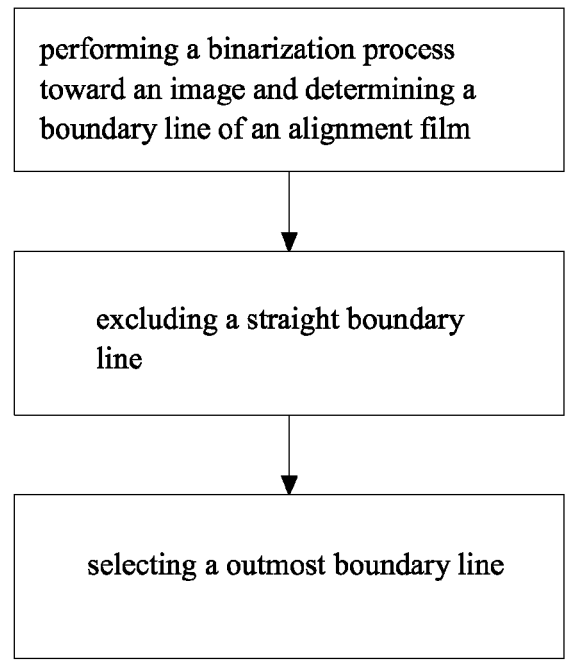
FIG. 1 is a flow-chart diagram illustrating the steps of performing the method for acquiring a boundary line of an alignment film provided by the present invention.

Referring to FIG. 1, which is a flow-chart diagram illustrating the steps of performing the method for acquiring a boundary line of an alignment film provided by the present invention, which includes the steps of:
A. processing an edge of an image and determining the boundary line of the alignment film;
B. conducting a first screen over the determined boundary line, and excluding a straight boundary line; and
C. conducting a second screen toward the firstly-screened boundary line, and selecting the outmost boundary line as the actual boundary line of the alignment film.

Substantially, performing a binarization process toward the image containing the alignment film firstly: a threshold value is set, and it is used to categorize the image containing the alignment film into two parts, including a pixel group which is greater than the threshold value and the other one which is smaller than the threshold value; wherein the gray level of the pixel group which is greater than the threshold value is set as 255, and the gray level of the pixel group which is smaller than the threshold value is set as 0. Certainly, it may be reversed in other embodiments, which means that the gray level of the pixel group which is greater than the threshold value is set as 0, and the gray level of the pixel group which is smaller than the threshold value is set as 255. After performing a binarization process toward the image, selecting any one of pixels within the image and comparing it with 8 pixels surround the selected pixel; the selected pixel is excluded if the gray value is consistent to the value of the 8 surrounding pixels; and the selected pixel is kept if the gray value of the selected pixel is different to the gray value of any one of the 8 surrounding pixels.

Figure 2A:
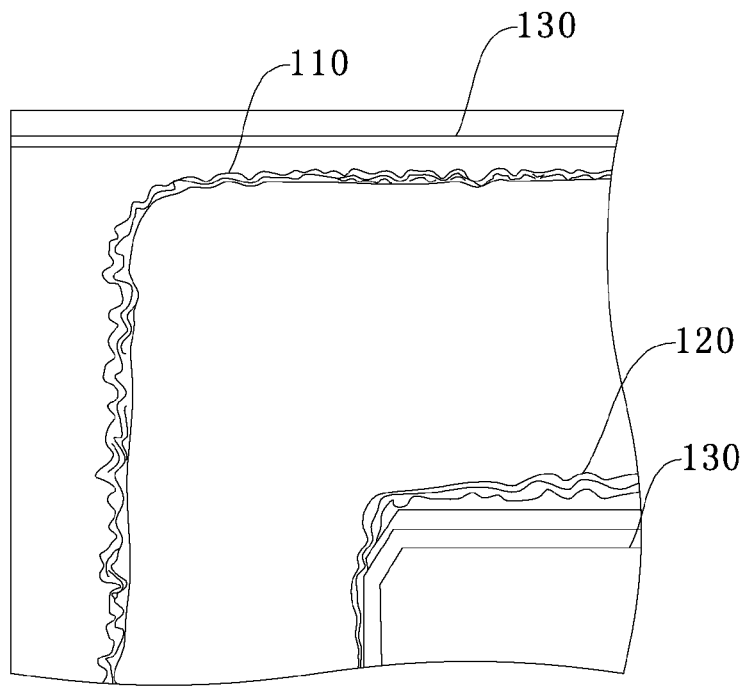

Referring to FIG. 2a, which is a structural and illustrational view of determining the boundary line of the alignment film by performing the method as recited above, because the alignment film is coated on a thin film transistor substrate or a color filter substrate, and there are a large number of the metal lines on a thin film transistor substrate or a glass substrate, and the gray level of the image pixel of the metal lines and the alignment film is inconsistent, so the determined boundary lines not only include the actual boundary line of the alignment film 110, but also include the boundary line of the metal lines 130, and the inner boundary line around the metal lines 120 due to unevenly coating of the alignment film or the inner boundary line 120 due to uneven diffusion of the PI liquid at edges. Therefore, the determined boundary line needs further processing.

Figure 2B:
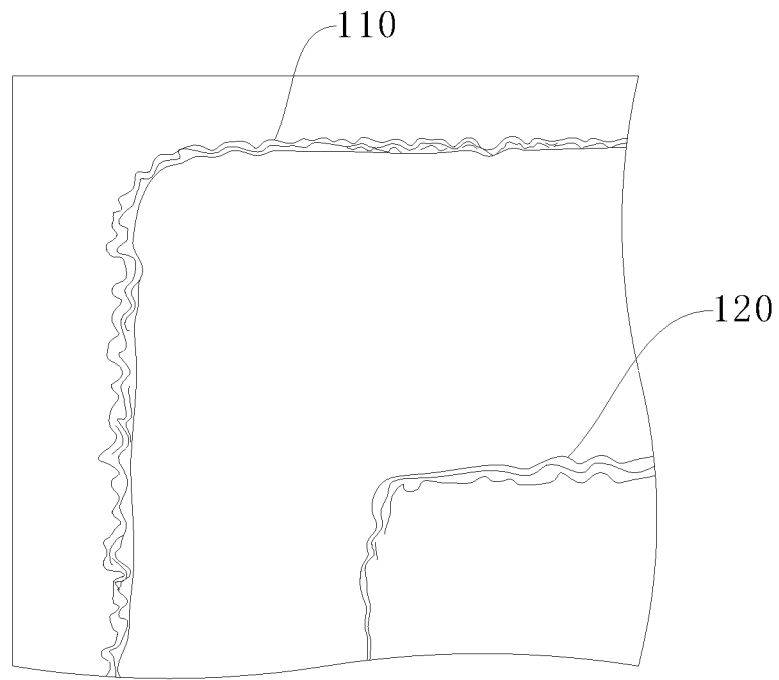

After determining the boundary line of the alignment film, conducting a first screen over the determined boundary line, substantially including the steps of: selecting a baseline and randomly selecting a plurality of segments of any determined boundary line; and calculating angles between the plurality of segments and the baseline, if all the angles demonstrate a fixed value, then exclude the boundary line; and if the angle is not a fixed value, the boundary line is kept. Of course, in other embodiments, angular differences between the plurality of segments from any determined boundary line can be calculated directly, and the boundary line is excluded if all the angular differences demonstrate fixed values, and the boundary line is kept if the angular difference is not a fixed value. Referring to FIG. 2b, which is a structural and illustrational view of conducting a first screen over the determined boundary line, the boundary line of the metal lines must be straight, and the contour of the boundary line after diffusion of PI liquid is a shilly curve, so a determined mistakenly boundary line of the metal lines 130 can be excluded after excluding the straight boundary line, and then the rest are the actual boundary line of the alignment film 110, and the inner boundary line 120 located inside the actual boundary line 110.

Figure 2C:
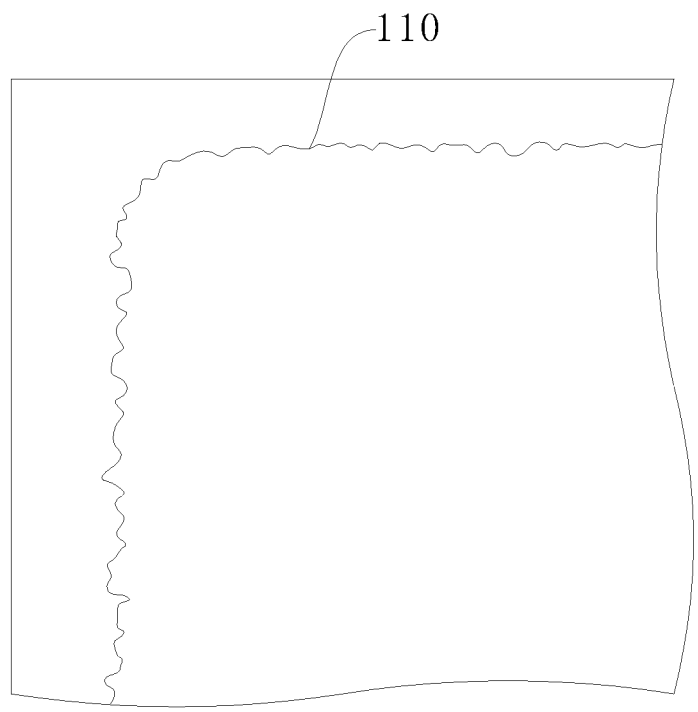
FIG. 2c is a structural and illustrational view of conducting a second screen toward the firstly-screened boundary line.

Furthermore, conducting a second screen toward the firstly-screened boundary line, substantially including the sub-steps of: establishing a x-y coordinate system; with X-axis value kept in a fixed value, keeping maximum and minimum value of the Y-axis, and deleting all other values of the Y-axis; with Y-axis value kept in a fixed value, keeping maximum and minimum value of the X-axis, and deleting all other values of the X-axis; and thereby the outermost boundary line is kept with the internal border line 120 deleted. Referring to FIG. 2c, the selected boundary line is the actual boundary line 110.

Based on the same inventive concept, the present invention further provides a method for inspecting an alignment film, including the steps of:
adopting a method for acquiring an actual boundary line of an alignment film as recited above;

performing a process of determining within an image of the alignment film; and performing a comparison between the processed image with data stored within a database so as to determine whether there is a defect.

The method reduces the difficulty of detection and improves the accuracy of detection by improving the accuracy of acquiring the actual boundary line of the alignment film.

In summary, according to the method for acquiring a boundary line of an alignment film and the method for inspecting the alignment film provided the present invention, not only the actual boundary line of the alignment film could be acquired quickly and accurately by screening the determined boundary line, but also the error rate of determining the boundary line of the alignment film could be lowered, so as to facilitate the control and prevention of the alignment film; and the method is simple and easy to operate.

Finally, it should be noted that, in this paper, such as the first and second terms of the type of relationship will only be used to operate with one entity or another entity or operate separate, but not necessarily required, or between these entities or operations imply the existence of any such actual relationship or order. Moreover, the term "comprising", "including" or any other variants thereof are intended to cover a non-exclusive inclusion, such that a number of elements including the process, method, article, or device including not only those elements, but also not explicitly listed other elements, or also for such process, method, article, or those elements inherent device. In the case where no more restrictions, by the statement "includes a . . . " qualified elements, including the said element does not exclude a process, method, article or device is also the same as the other elements present.

Although embodiments of the present invention have been described, persons of the skilled in the art should understand that any modification of equivalent structure or equivalent process without departing from the spirit and scope of the present invention limited by the claims is allowed.

What is claimed is:

1. A method for acquiring a boundary line of an alignment film, wherein an image comprising therein fractions of image having boundary lines is provided in advance, at least one the fractions of the image corresponding to an alignment film, and the method includes the steps of:

A. processing an edge of the image and identifying the boundary lines of the image that include the boundary line of the alignment film and an additional straight boundary line, wherein a binarization process is performed toward the image to convert the image into a plurality of pixels each having a gray value, the gray value of a selected one of the pixels being compared with the gray values of the pixels surrounding the selected pixel so that the selected pixel is excluded if the gray value of the selected pixel is consistent with the gray values of the surrounding pixels and, alternatively, the selected pixel is kept if the gray value of the selected pixel is different from the gray value of one of the surrounding pixels;

B. conducting a first screening operation over the boundary lines of the image and excluding the straight boundary line with the remaining ones of the boundary lines as first-screened boundary lines; and C. conducting a second screening operation toward the firstly-screened boundary lines and selecting an outmost one of the firstly-screened boundary lines as an actual boundary line corresponding to the alignment film.

2. The method as recited in claim 1, wherein step B includes the sub-steps of: selecting a baseline and randomly selecting a plurality of segments of one of the boundary lines of the image; and calculating angles between the plurality of segments and the baseline, so that if all the angles demonstrate a fixed value, the boundary line is excluded.

3. The method as recited in claim 1, wherein step B includes the sub-steps of: randomly selecting a plurality of segments of one of the boundary lines of the image; and calculating angular differences between the plurality of segments, so that the boundary line is excluded if the angular differences are 0 degree or 180 degrees.

4. The method as recited in claim 1, wherein step C includes the steps of: establishing a x-y coordinate system; with X-axis value kept in a fixed value, keeping a maximum value and a minimum value of the Y-axis and deleting all other values of the Y-axis; and with Y-axis value kept in a fixed value, keeping a maximum value and a minimum value of the X-axis and deleting all other values of the X-axis.

5. A method for inspecting an alignment film, wherein the method includes the steps of:

adopting a method for acquiring an actual boundary line of an alignment film as recited in claim 1;

performing a process of determining within an image of the alignment film; and performing a comparison between the processed image with data stored within a database so as to determine whether there is a defect.

6. The method as recited in claim 5, wherein step B substantially includes the sub-steps of: selecting a baseline and randomly selecting a plurality of segments of one of the boundary lines of the image; and calculating angles between the plurality of segments and the baseline, so that if all the angles demonstrate a fixed value, the boundary line is excluded.

7. The method as recited in claim 5, wherein step B includes the sub-steps of: randomly selecting a plurality of segments of one of the boundary lines of the image; and calculating angular differences between the plurality of segments, so that the boundary line is excluded if all the angular differences demonstrate fixed values.

8. The method as recited in claim 5, wherein step C includes the steps of: establishing a x-y coordinate system; with X-axis value kept in a fixed value, keeping a maximum value and a minimum value of the Y-axis and deleting all other values of the Y-axis; and with Y-axis value kept in a fixed value, keeping a maximum value and a minimum value of the X-axis and deleting all other values of the X-axis.

* * * * *